Patented Aug. 31, 1943

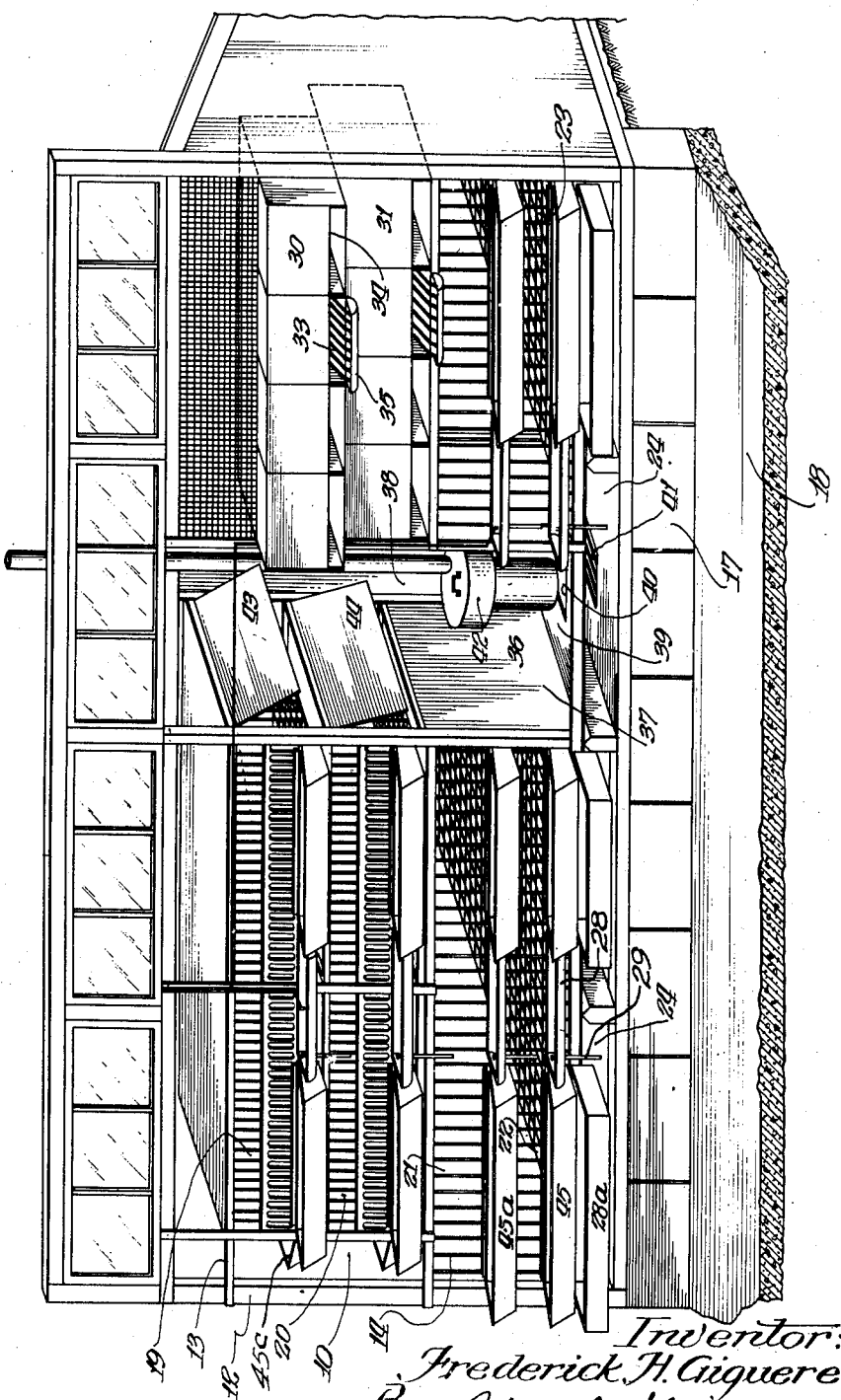

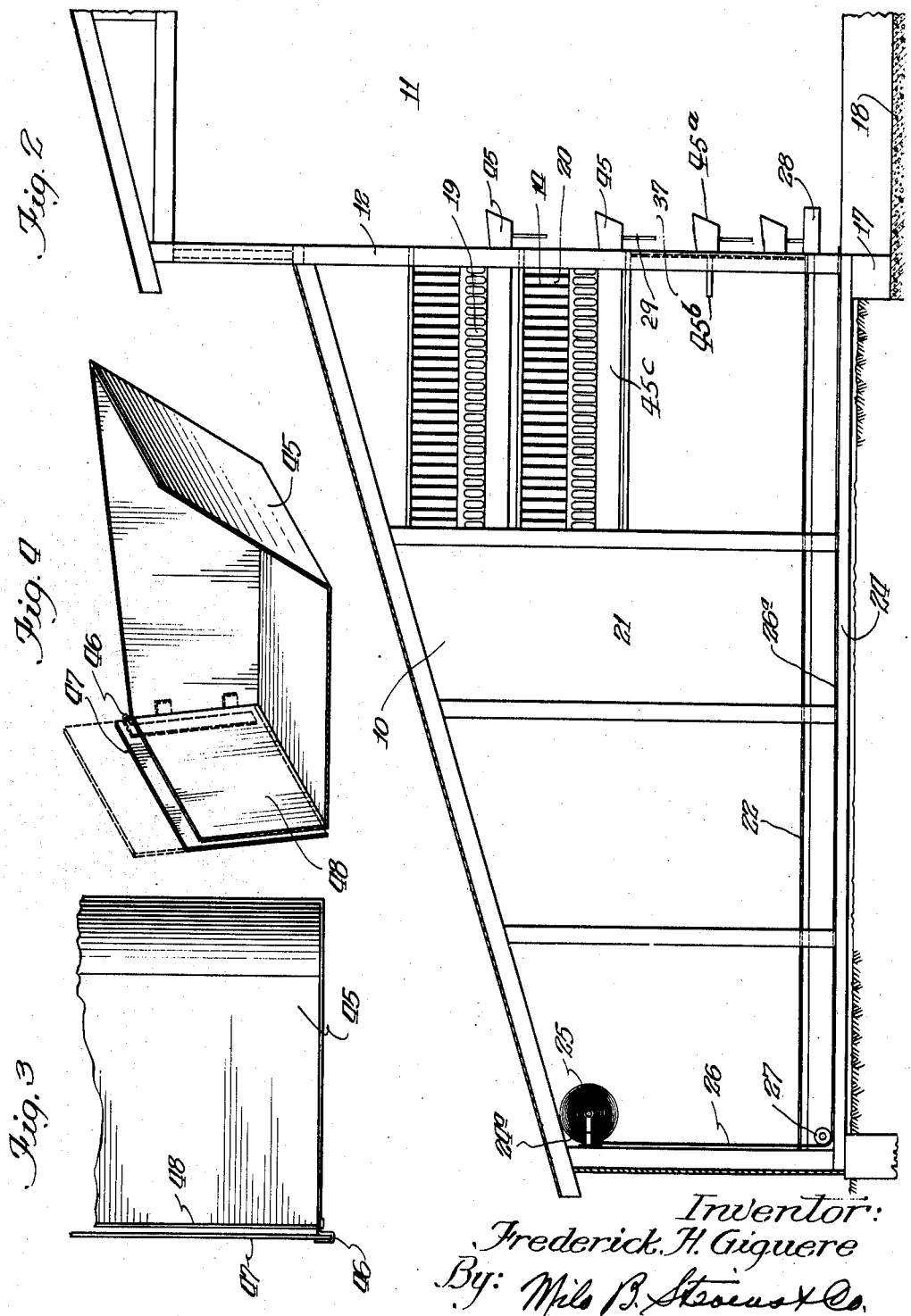

2,328,209

UNITED STATES PATENT OFFICE 2,328,209

POULTRY HOUSING

Frederick H. Giguere, Joliet, Ill.

Application April 8, 1939, Serial No. 266,852

3 Claims. (Cl. 119—21)

My invention relates to equipment for housing and brooding poultry, and has for its main object to provide an assembly which serves as a facing or front from the viewpoints of installation and service of, and approach to the equipment.

A further object of the invention is to provide a front for a poultry house or division which is of a standard size and rated capacity which carries the forward and rearward equipment necessary for the successful brooding of chicks of all ages and housing of adults for egg production.

A still further object of the invention is to define the novel invention as an assembly of units forming a front wall for divisions of an enclosure which line a passage or corridor by way of which all access, care and attendance to the poultry in the units are quickly and easily accomplished.

Another object of the invention is to combine with the frontal assembly an arrangement of equipment in positions best suited from the viewpoints of space, economy, proper temperatures and sanitation.

An additional object of the invention is to design an equipment installation which is readily convertible from poultry raising to egg production and vice versa without additional equipment Another object of the invention is to so design the installation that it may be reasonably priced for operation on a small scale, yet expansible to extended proportions.

An additional object of the invention is to incorporate in the frontal assembly a centrally located heating unit and heat room with means for the advantageous distribution of controlled heat.

Another object of the invention is to provide a two-floor battery brooder, rearwardly incorporated in the pen front and placed adjacent to the heat room, each floor receiving its required supply of heat by way of adjustable openings in the upper part of the heat room.

An additional object of the invention is to arrange the equipment, such as the battery brooder, and heating unit so that all the service attendance to the same is accomplished by way of the frontal passage or corridor.

Another object of the invention is to design the novel system along unitary lines, so that the cost of housing and operating the equipment will be much less than existing methods of close confinement, and the desired equipment can be furnished in sections according to the size of a given enclosure.

With the above objects in view, and any others which may suggest themselves from the description to follow, a better understanding of the invention may be had by reference to the accompanying drawings, in which—

Fig. 1 is a perspective view of a complete vertical unit or pen front as viewed from the corridor, partly in section;

Fig. 2 is an enlarged left-hand side view of Fig. 1 with the corresponding end wall of the enclosure removed;

Fig. 3 is an enlarged plan view of one end portion of a feed trough; and

Fig. 4 is a perspective section of the opposite end portion of the feed trough.

It is a familiar fact that many failures in poultry keeping and brooding can be traced to contamination and disease through lack of sanitation. The battery brooder and the laying battery were evolved from a desire to improve sanitation and feed control, and they have been successful to a marked degree. However, installations of this character involve high costs for equipment and buildings to properly enclose the same; and the extremely close confinement of laying hens in batteries has robbed them of the much needed exercise they previously enjoined on the floors. It has therefore been my intention to design an installation which eliminates these deficiencies and establishes a new order in the art of housing and brooding poultry.

In accordance with the foregoing, I have illustrated in the drawings as a matter of example an enclosure or building best suited for the unitary equipment assembly, although it is evident that existing enclosures or buildings could easily be altered to accommodate one or more units of the same. Thus, the frontal unit primarily utilizes a compartment 10 adjoining the central passage or corridor 11. Only one of the compartments or pens and only a portion of the corridor have been illustrated, and another assembly may be installed on the opposite side of the corridor. A standard assembly may have a certain capacity; and when a demand arises for a greater capacity, a second assembly may be placed endwise of the original installation, so that the corridor 11 becomes extended to serve the additional equipment.

In contemplating the novel assembly, the same may be constructed with a framework of steel or other structural material involving uprights 12, rails 13 and gratings 14, all contributing to form a series of pens and nests with a heat room interposed. The structure may be erected above a line of cement blocks 17 on a suitable floor 18, and any conventional means or connections may be employed to adapt an enclosure or existing building to it for purposes of shelter and protection.

The assembly of pens preferably comprises an upper battery brooder 19, a lower one 20, and a spacious bottom chamber or pen 21 for the growing or adult birds. Floor gratings 22 and 23 are laid to a prescribed rear limit, so that a maximum space is provided for a contemplated number of birds, that these may have ample room for movement or exercise. Four inches below each floor grating a dropping platform 24 is provided. As indicated in Fig. 2, the rear of the pen 21 has a bracket frame 24a to support a roll of waterproofed kraft paper 25, from which a sheet 26 is led downwardly and then trained under a guide roller 27 to extend forwardly over the dropping platform as indicated at 26a. One or more of these rolls may be mounted in the pen, as found necessary. The kraft paper serves as a sub-flooring to receive the droppings. The free end of this roll may be pulled outwardly to renew the sub-flooring whenever necessary.

A heat room 36 is installed in the front of the pen assembly. This heat room has a partition comprising side walls 37, a rear wall 38 constituting an emergency door giving access to the interior of the pen 21, and a floor 39, the latter being formed with one or more openings 40. Below these the floor 24 extended from the dropping platform is formed with a grated opening 41 for the admission of fresh air through the perforated floor 39 into the heat room. The heat room contains a heater 42 of a suitable type and size, and the heat therefrom is radiated from the heat room into the corridor to spread sidewise into the pens.

Adjacent the heat room are the upper and lower brooder compartments 19 and 20. These are for the purpose of raising chicks to the age of five or six weeks after which time they are transferred to the lower pen. Adjacent the heat room the brooder compartments 19 and 20 are equipped with shutters 43 and 44 opening into the heat room, the shutters being swung from the top and designed to control the amount of heat entering into the brooders from the heat room, so that each floor may be maintained at different temperatures when necessary. Due to the position of the shutters near the top of heat room, the one heating unit will supply all the heat necessary for the lower pen, and a much greater heat to the brooding units above, the heat entering at the nursery or heater end of the brooder compartments and gradually decreasing to room temperature as it passes to the opposite end of the compartments.

On the right-hand side of the heat room 36 is a series of nests 30 and 31. Each nest is equipped with a slanting floor grating 33 issuing from the rear of the nest by way of a frontal opening 34 therein. The gratings terminate in troughs 35 to catch the eggs laid and deliver them within easy access of the operator or attendant. The nests open rearwardly into the pen 21 and are freely accessible to the birds therein.

The poultry pen front is equipped with a series of vertically-spaced feed troughs 45, the form of these being more clearly shown in Figs. 3 and 4. Thus, the sides of each trough are formed at the rear with channel guides 46 for a snugly fitted slide 47; and forwardly of the latter the troughs have rear walls 48. In its normal or feeding position the slide 47 rises slightly above the trough edge, as indicated in Fig. 4; however, when feeding is to be stopped the slide or deflector 47 is raised to the top, as indicated by the dotted line position in the said figure. When the feed troughs are in use, all feed that is "billed" over the edge and formerly wasted is deflected downwardly into the subjacent trough; and the feed billed from the lowest feed trough is deflected into an overflow box 28. The feed troughs are usually near the bottoms of the pens, but the capacity for a given pen may be increased by adding a trough 45a at a higher elevation, as shown in Fig 2, a perch 45b furnishing access to the same. Feed troughs may also be provided along the outer ends of the battery brooders 19 and 20, as shown at 45c. Fig. 1 also shows, as a matter of illustration, a simple watering system wherein pouring the water into the top one of a vertically-spaced series of vessels 28 serves to fill all of them. Thus, each vessel has an overflow pipe 29 rising in it to the desired water level, and it follows that the vessels will fill in downward sequence, the pouring being stopped when the lowermost overflow pipe begins to drain. Bottom receptacles 28a are also provided below the feed troughs to catch stray or falling feed.

It is evident from the foregoing description that I have provided a unitary pen front which enables poultry of different ages to be raised, grown for sale or kept for egg production purposes, the care of the poultry being effected principally by way of a passage or corridor facing the vertical pen front. Furthermore, I have provided a brooding unit in the pen front of sufficient capacity to brood all the chicks necessary for the rated adult capacity of the front or for weekly rotation of broilers. Further, the arrangement of the central heat room serves the double purpose of providing a general suitable room temperature as well as the required extra heat for the chicks in the brooder compartments without additional heat units in these compartments. Also, the heat room is constantly supplied with fresh air through the open spaces under the heat room floor. I have provided a feed trough that saves the feed "billed" by the birds of all ages, and one that may instantly be closed to prevent feeding at any time, without removing the trough. Altogether, the novel poultry pen front serves as a front wall for a poultry house or for a division thereof created by the central passage or corridor, and is adaptable to new as well as existing enclosures. It may be supplied as one installation, easily assembled and standard in size for a given capacity.

While I have described the novel installation along specific lines, various minor changes and refinements may be made without departing from its principle, and I desire to consider all such changes and refinements as coming within the scope and spirit of the appended claims.

I claim:

1. A poultry brooding and keeping installation comprising a poultry house having rear and side walls, and a structure substantially forming a frontal filler between said side walls, said structure being divided laterally into battery brooders, a heat room, and frontal compartments combining with a portion of the floor space in said poultry house to form a pen for growing and adult poultry, said compartments and floor space adjoining the lower portion of said heat room and the battery brooders adjoining the upper portion thereof, whereby to maintain a much higher temperature in the battery brooders than in said compartments and floor space.

2. A poultry keeping installation comprising a poultry house having rear and side walls, a structure substantially forming a frontal filler between said side walls, said structure and the space to the rear of the filler in said poultry house including a poultry pen from front to rear for growing and adult poultry, a frontal heat room intermediately located in the pen and rising the full height thereof, battery brooders in the pen front adjoining the upper portion of the heat room on one side, and laying nests in the pen front adjoining said upper portion on the other side.

3. A poultry house having a rear and side walls and a partition between said side walls, battery brooders for small birds on the upper part of and a chamber for larger birds on the lower part of one side of the partition, nests on the other side of said partition, one of the walls of the proximate nests to the partition being spaced from the latter, heating means within said space and means within said space for controlling the flow of heat from said space through said partition to said brooders, said controlling means being above the level of the chamber for the larger birds.

FREDERICK H. GIGUERE.